United States Patent [19]
Anderson et al.

[11] Patent Number: 5,529,182
[45] Date of Patent: Jun. 25, 1996

[54] DUAL DISC ADAPTER WITH DOWNWARD SLOPING OUTSIDE CORNER WEDGES

[75] Inventors: Norman W. Anderson, Menomonie, Wis.; Paul A. Amundson, Clear Lake, Minn.

[73] Assignee: Minnesota Mining And Manufacturing Company, St. Paul, Minn.

[21] Appl. No.: 342,336

[22] Filed: Nov. 18, 1994

Related U.S. Application Data

[63] Continuation-in-part of Ser. No. 152,467, Nov. 12, 1993, abandoned.

[51] Int. Cl.$^6$ ..................................................... B65D 85/57
[52] U.S. Cl. .................. 206/308.1; 206/310; 206/493
[58] Field of Search ............................. 206/308.1, 308.2, 206/310, 493, 309, 312, 313

[56] References Cited

U.S. PATENT DOCUMENTS

| | | |
|---|---|---|
| 4,176,744 | 12/1979 | Borzak .................................. 206/310 X |
| 4,327,831 | 5/1982 | Inaba et al. . |
| 4,709,812 | 12/1987 | Kosterka . |
| 4,895,252 | 1/1990 | Nomula et al. . |
| 5,168,991 | 12/1992 | Whitehead et al. . |
| 5,246,107 | 9/1993 | Long et al. . |
| 5,249,677 | 10/1993 | Lim ....................................... 206/310 |
| 5,259,498 | 11/1993 | Weisburn et al. . |
| 5,284,242 | 2/1994 | Roth et al. . |
| 5,285,893 | 2/1994 | Misterka et al. . |
| 5,419,433 | 5/1995 | Harrer et al. ............................ 206/313 |
| 5,421,453 | 6/1995 | Harrer et al. ............................ 206/312 |

OTHER PUBLICATIONS

3½" diskette holder from Gallagher Business Development (G. B. D.)/Epic.

*Primary Examiner*—Bryon P. Gehman
*Attorney, Agent, or Firm*—Gary L. Griswold; Walter N. Kirn; Susan Moeller Zerull

[57] ABSTRACT

The invention is a dual purpose adapter insert for holding an optical disc. The adapter insert can be used in the lid section of a standard jewel case thereby enabling the standard jewel case to hold two optical discs. The adapter insert can also be used in a paperboard package by sliding the corners of the insert into the slots in the paperboard package.

9 Claims, 5 Drawing Sheets

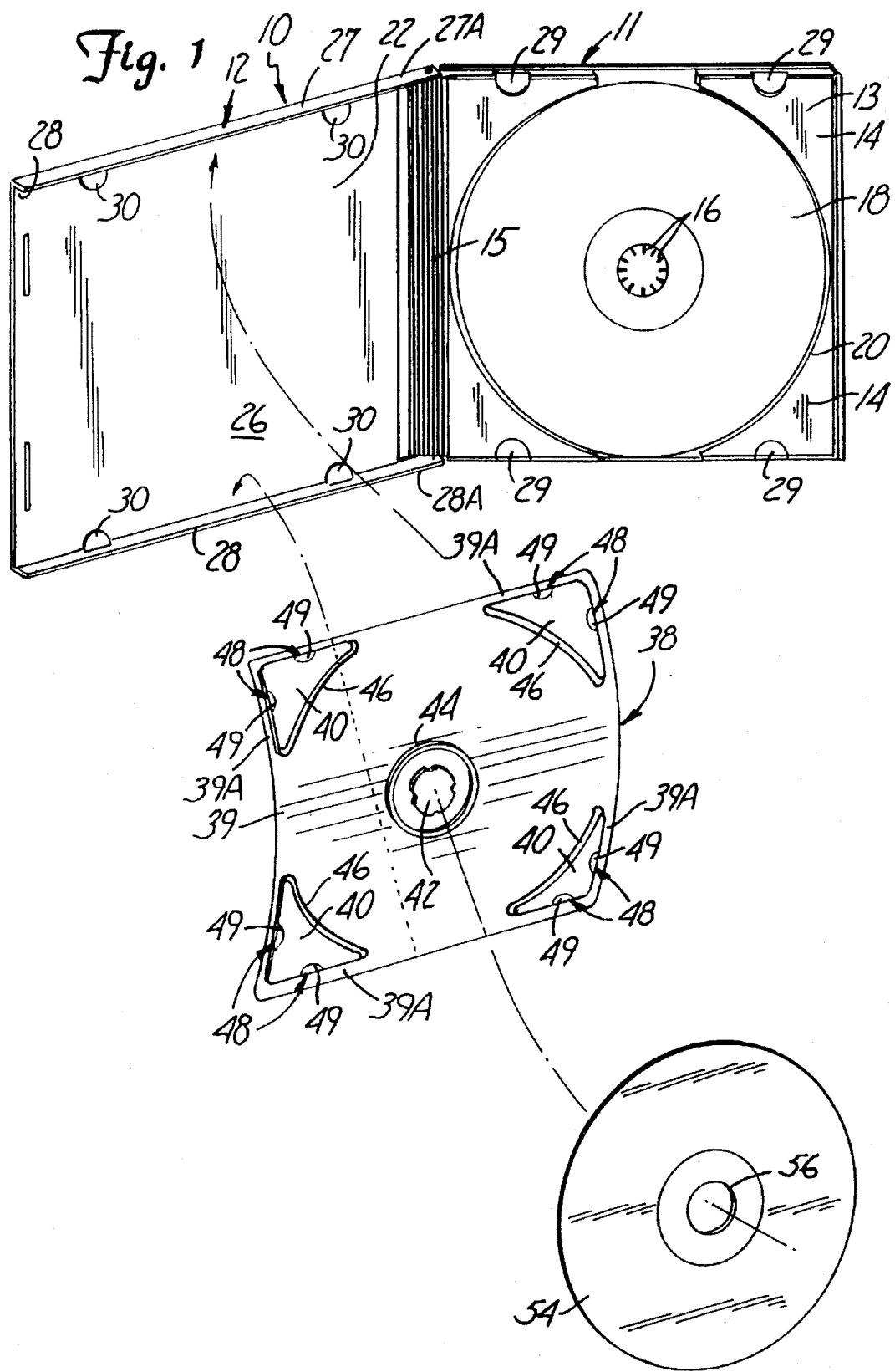

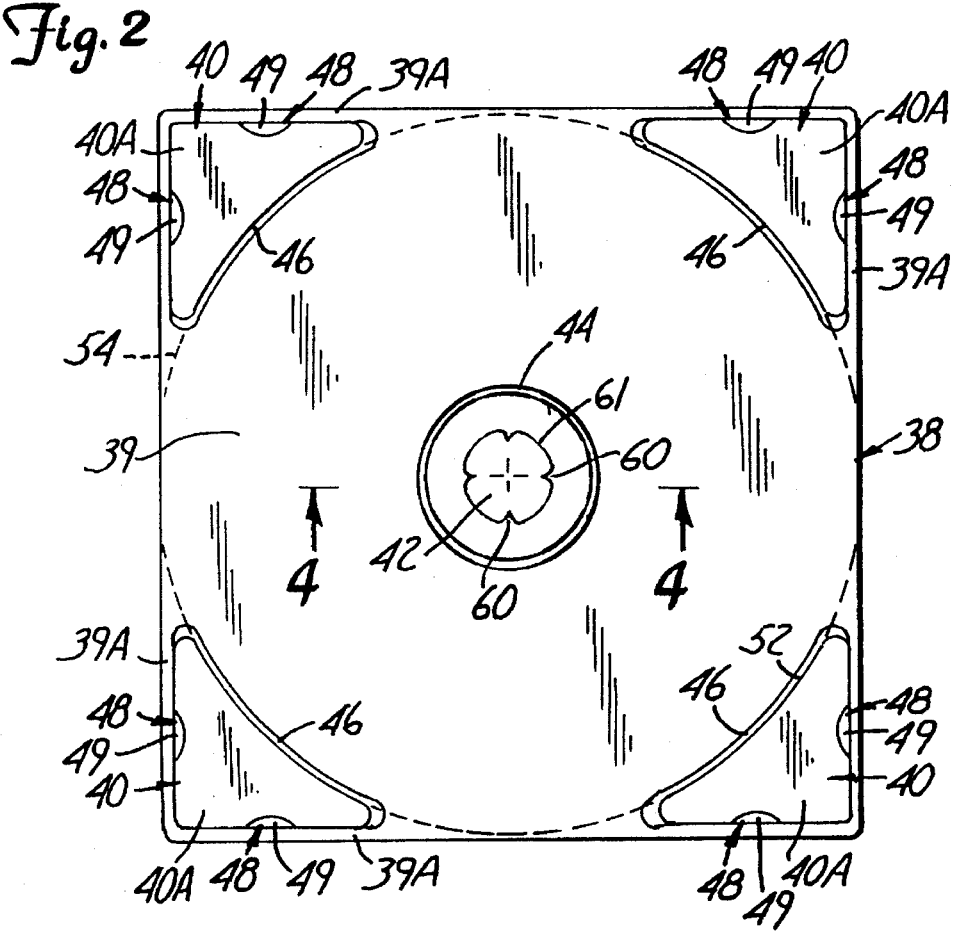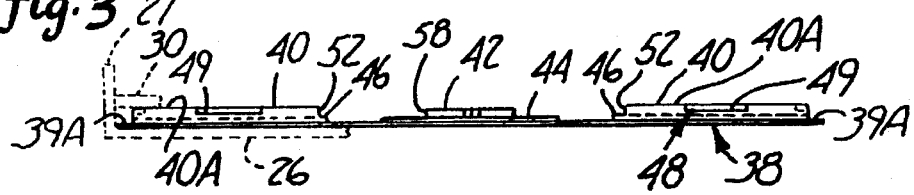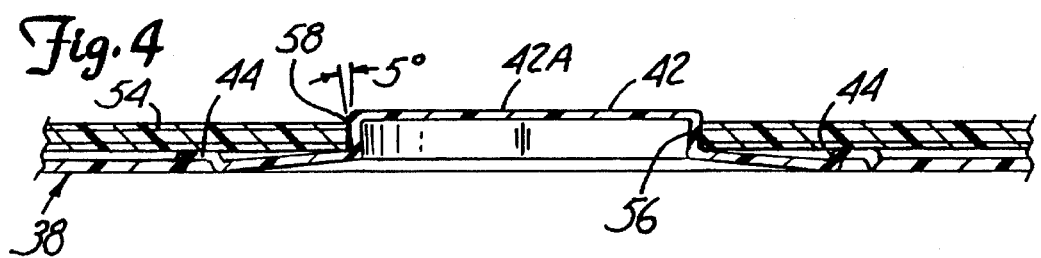

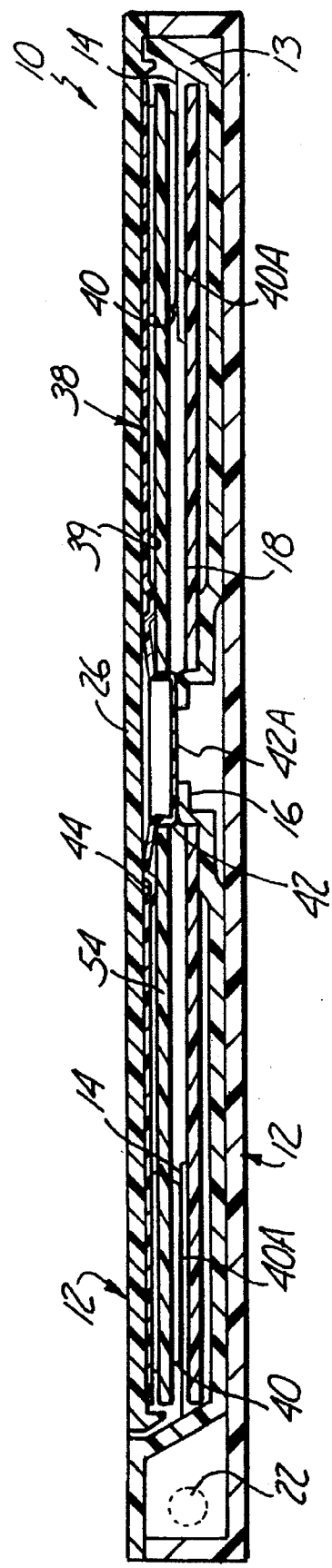

DUAL DISC ADAPTER WITH DOWNWARD SLOPING OUTSIDE CORNER WEDGES

This is a continuation-in-part of U.S. application Ser. No. 08/152,467 filed Nov. 12, 1993.

FIELD OF THE INVENTION

The present invention relates to a dual purpose adapter insert for optical discs which can be used to hold optical discs in enclosures of both the jewel case type and the paperboard package type.

BACKGROUND OF THE INVENTION

An optical disc is a circular disc for storing optically readable information. Optical discs have found wide acceptance as, for example, CD ROMs for digitally stored text or graphics, as well as compact discs (CDs) for recorded music.

One type of enclosure which has been developed for storing optical discs is the transparent plastic jewel case. Such a jewel case comprises a bottom section and a lid section, with each section being a rectangular panel having upright edge walls attached thereto, so that each section is an open box having relatively low walls. The bottom section and the lid section are hingedly connected along one edge, with the open sides facing one another, so that the case opens and closes much like a book, thereby forming an enclosure.

The standard disc holding tray is placed into the bottom section and an optical disc is supported on this tray. The lid section of a standard jewel case is provided with tabs that extend inwardly from opposite edge walls of the lid section. These lid tabs are useful for holding paper or light cardboard inserts which carry printing, graphics, or other indicia, in such a way that they can be viewed through the transparent lid panel.

When a multiple disc package is needed, various complex constructions have been used. For example, three panel jewel cases, capable of holding two discs, having a center panel which supports discs on its opposite sides and having hinged bottom and lid panels folding over the center panel on opposite sides have been advanced.

Paperboard packages having a folded construction capable of holding two optical discs have also been advanced. U.S. Pat. No. 4,709,812 discloses several folded paperboard disc packages wherein CDs are held in place by injection molded plastic holders which may, for example, be adhesively affixed to one or more of the paperboard panels.

U.S. Pat. No. 4,895,252 shows a commercially available optical disc package having a special hub which holds a disc by a friction fit which is used for storing a single CD.

Additionally, magnetic computer diskettes have been packaged in the lid section of jewel cases along with an optical disc packaged in the bottom section. To hold the diskette in place, an insert panel has been advanced wherein the diskette is held in a large recess which is surrounded by a raised peripheral ledge. Finger lift recesses are provided in the ledge at the edges of the large recess to ease the task of lifting the diskette out of the insert panel.

Since the costs of jewel cases presently in use are reduced by the large volume of standard cases produced, there is a need to keep the configuration of these cases standard and unchanged. At the same time, exceptional needs, such as the need to package two discs in a standard jewel case intended for one disc, are not uncommon.

In the case of paperboard packaging of optical discs, there is a need to provide a holder for optical discs which is more easily assembled, without the need for specialized adhesive application equipment, than the presently available adhesively bonded disc holders.

SUMMARY OF THE INVENTION

The inventors have found that these two diverse sets of needs can be met by a single adapter insert which can function either as an added disc holder for use in a jewel case, or as a disc holder in a paperboard optical disc package. Enabling a single adapter insert to fulfil both functions simplifies production and reduces production costs.

The dual purpose adapter insert of this invention, when used in a jewel case, enables the jewel case to hold two optical discs, instead of the customary one disc, with both discs held safely, securely, and spaced apart from one another, thereby avoiding damage which might arise from the discs contacting one another. When used in a paperboard package, the corners of the adapter insert are easily inserted into apertures in the package, so that the adapter insert is securely held in place without the use of adhesive. The adapter insert can be used either with manual or automated assembly procedures.

When used in a jewel case, the adapter insert of the present invention supports and retains a compact disc inside an enclosure, e.g. the lid section of a jewel case. The adapter insert is made to be held in place by the inwardly extending lid tabs found in standard jewel cases. The adapter insert is sufficiently flexible to be bent in the manner necessary to insert it beneath the tabs, yet sufficiently stiff to hold and support an optical disc in the required manner. A retainer hub in the center of the adapter insert frictionally fits into the center bore of the optical disc, while a portion of the adapter insert near the retainer hub supports the center portion of the disc. In addition, the adapter insert provides peripheral support bosses which support the edge of the disc. Locator recesses on the adapter insert receive the lid tabs and positively position the adapter insert in the lid section. The combination of the locator recesses and the lid tabs, along with elevated surfaces provided by the retainer hub and peripheral support bosses, serve to hold the adapter insert in the lid section and maintain an air gap between the two discs in the jewel box when the box is closed. In addition, the adapter insert can be made sufficiently thin to leave some clearance between the tabs and the lid panel so as to allow paper or thin cardboard informational inserts to be placed between to the transparent lid panel and the adapter insert for viewing from outside the jewel box.

When the adapter insert of the present invention is used in a paperboard package, it can be retained in the package by inserting the corners of the adapter into slots provided in the cardboard package. In one embodiment, this insertion is facilitated by tapered insertion wedges incorporated into the peripheral support bosses of the adapter insert. The tapering of the peripheral support bosses also improves the appearance of the package and reduces the risk of tearing of the package by the inserted peripheral support bosses.

BRIEF DESCRIPTION OF THE DRAWINGS

FIG. 1 is a view of a compact disc jewel case shown in an open position, and an adapter insert made according to a first embodiment of the present invention, shown in exploded view prior to insertion into the jewel case lid.

FIG. 2 is a top plan view of the adapter insert of the present invention.

FIG. 3 is a side elevational view of a first embodiment the adapter insert of the present invention.

FIG. 4 is an enlarged sectional view taken as on line 4—4 in FIG. 2 shown with a compact disc in place.

FIG. 5 is a sectional view of a jewel case in its closed position showing the adapter of the present invention in place holding a second compact disc thereon.

DETAILED DESCRIPTION OF THE PREFERRED EMBODIMENTS

Figure 6:
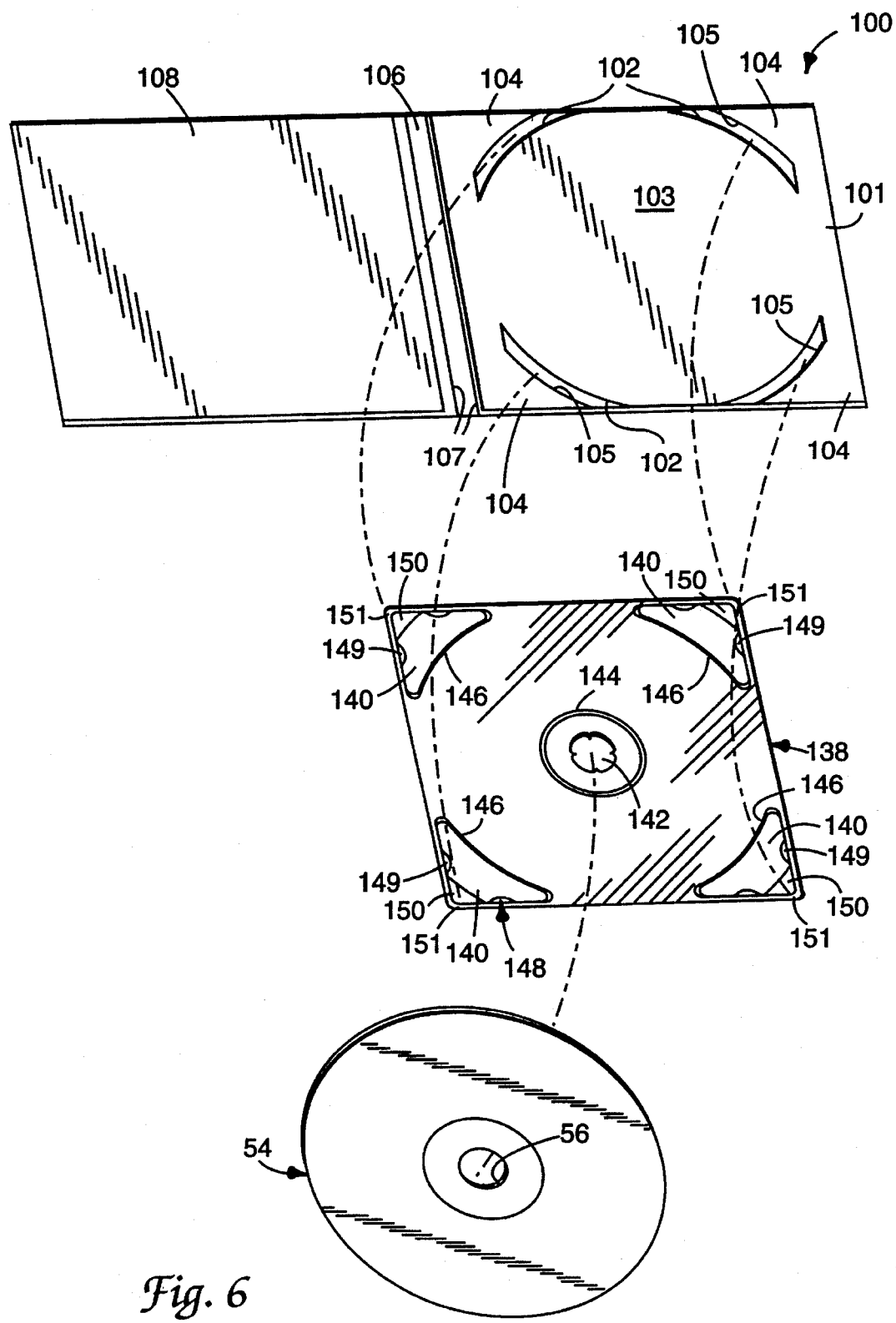
FIG. 6 is a view of a paperboard package, shown in an open position, and an adapter made according to a second embodiment of the present invention, shown in an exploded view prior to insertion into the paperboard package.

Referring to FIG. 1, a compact disc jewel case indicated generally at 10 forms an outer package for a compact optical disc (CD) and includes a bottom or base section 11 and a lid or cover section 12 that are hinged together along one edge. The bottom section 11 has a standard compact optical disc supporting tray 13 therein, which includes raised corner portions 14 at the corners of the bottom section 11. The tray 13 is held in place with suitable interfitting lugs on the sides that snap into openings in the walls of the bottom section. The tray 13 has a ledge 15 that overlies the edge of the bottom section in the hinge region. A center hub retainer 16 has a plurality of "fingers" to retain a CD. The tray 13 supports a compact disc 18 on its peripheral edge on suitable lands or support surfaces 20 at locations adjacent to the corner portions 14. The center portion of the compact disc 18 is also supported on a support surface that surrounds the hub 16 on the standard tray 13.

The two jewel case sections 11 and 12 are hinged together about a hinge line indicated generally at 22, so that they can open and close in a normal manner. The lid section 12 is typically transparent, and includes a lid panel 26, and walls 27 and 28 on opposite sides thereof. The walls 27 and 28 have extensions 27A and 28A that extend to provide brackets to hinge the lid section to the bottom section. Lid panel 26 has walls on two sides of the panel, with at least one edge being open as shown at 28B.

The side walls 27 and 28 on opposite edges of the lid panel 26 each have a pair of inwardly extending tabs 30. Tabs 30 are spaced upwardly from the inner surface of the lid panel 26 a desired amount and form over-hanging retainer ledges. Tabs 30 normally are used for retaining printed sheets, one side of which is visible through the transparent lid panel 26. The standard tray 13 has recesses 29 for providing clearance for the tabs 30 when the lid section 11 is closed to avoid interference with the lid section 11.

The standard jewel cases are widely used for various compact discs including CD ROM and music compact discs and are very high production items. Automated equipment is available for loading the standard trays 13 and the single disc 18 normally packaged in the jewel case. Thus, the jewel case, tray and single CD package that is shown in FIG. 1 is a high production, low cost package.

In many instances a set of two compact discs is needed to carry the information that is desired to be provided, and the present invention utilizes the standard, high production, low cost jewel cases for packaging two compact discs. As shown in FIGS. 1, 2, 3 and 4 the adapter insert of the present invention comprises a flexible polymer adapter insert 38 that has a main flat planar insert panel 39 of desired thicknesses, having four raised corner bosses 40 formed at the four corners of the adapter insert 38 to define a central region for receiving a compact disc. Additionally, the flat insert panel 39 has a central raised retainer hub portion 42 that is surrounded by a lower level annular boss or flange 44 that is spaced outwardly from the hub to contact the compact disc in the desired location.

Each of the raised corner bosses 40 is provided with a part annular land 46 that is formed at the interior edge of each corner boss. The lands 46 are raised slightly above the insert panel 39 and have substantially the same height as the surface of the annular boss or flange 44.

Each of the corner bosses 40 has a pair of recesses 48 that are formed in the upper surface of the bosses 40 and the recesses extend inwardly from the respective edges of the adapter insert 38 forming that particular corner. The corner bosses 40 are also spaced inwardly slightly from the adjacent peripheral edges of the insert panel 39. The height of upwardly facing surfaces 49 of recesses 48 above the insert panel 39 by rim portions 39A is selected to be such that recesses 48 receive the tabs 30 when the adapter insert is placed into the lid 12.

The lands 46 on each corner boss 40, as can be seen in FIG. 2, are part annular, and a part cylindrical retaining shoulder surface 52 is formed on each corner boss 40. The radius of the part cylindrical surface on each corner boss is slightly larger than the radius of a compact disc 54 which is to be received by the adapter insert.

The land support surfaces 46 support the edge of the compact disc in a non information region. The compact disc is also held in position by the part cylindrical upright shoulder surfaces 52 that can be seen in FIG. 2.

As shown in FIGS. 3 and 4, the outer peripheral surface 58 of retainer hub 42 forms an interference fit with a normal bore opening 56 in a compact disc 54 to be stored in the jewel case on the adapter insert 38. The outer surface 58 is undercut, or in other words the outer surface 58 tapers inwardly about 5 degrees to a smaller diameter from the outer end of the hub 42 toward the insert panel 39. The hub 42 is of circular cross section as shown, and a number of inwardly directed recesses or "carets" 60 are formed around the outer end peripheral edge 61 of the hub. The outer peripheral edge 61 is sized for a slight interference fit with the CD bore opening 56, and the carets or inwardly directed recesses 60 are provided to permit the periphery of the retainer hub 42 to compress slightly when a compact disc is pressed onto the retainer hub 42 so that there are gripping and retaining forces when using the undercut peripheral surface.

As shown in FIGS. 4 and 5, when a compact disc is placed on the hub 42 and slid past the outer end of the hub, the undercut of the outer surface 58 of the hub 42 will tend to seat the disc near the base of the hub 42. The boss or flange 44 rests against the compact disc at location spaced from the hub. The undercut of outer surface 58 provides a retaining force so that the insert panel 39 bows up in the region between the boss 44 to the hub 42, causing the panel 39 adjacent to the hub 42 to contact the compact disc.

The material for the adapter insert 38 is preferably a moldable polymer such as PETG, PVC or a polystyrene. The insert panel 39 is made relatively thin and flexible, so that the insert panel 39 can be bowed upwardly in the center (as schematically shown in FIG. 1) and two side edges of the adapter insert can be slipped under the tabs 30 when the adapter insert is placed over lid panel 26 while insert panel 39 is in bowed condition. The edges of the bowed insert panel 39 fit in the space between the ends of the tabs 30 on opposite walls, and when the insert panel 39 is released, the insert panel 39 flattens out and slips under the tabs 30 for retention as shown in dotted lines in FIG. 3. The tabs 30 fit into recesses 48 and the adapter insert is held in proper position.

It is necessary to achieve a balance between flexibility and holding power. An insert panel 39 with a thickness of approximately 0.015 of a material such as PVC has been found to have the desired flexibility to allow for bowing and insertion of the adapter while having sufficient rigidity to retain the compact disc in position. PVC and other polymers can be thermomolded to form corner bosses 40, lands 46, hub 42 and boss 44.

The material used for the adapter insert can be thermoformable, or suitable for injection molding, blow molding, or other molding processes which allow an undercut or draft to be formed on the hub, or on shoulder 52, which also can be sized and undercut to retain the edges of a compact disc if desired.

When an insert panel 39 is bowed up as shown in FIG. 1 so the edges of the adapter insert 38 are slid under the tabs 30, the surfaces 49 of the recesses 48 will fit underneath the respective tabs 30. The surface of insert panel 39 opposite from the hub 42 (the lower surface) is permitted to flatten against the inside of the lid panel 26 and the tabs 30 hold the adapter insert 38 located in its proper place. The adapter insert 38 retains and holds a second compact disc 54 in position in the lid section of the standard one disc jewel case to provide a dual package as shown in FIG. 5.

As also shown in FIG. 5, the second disc in the lid section 12 is supported in a spaced relationship from the first disc 18. The upper surface or end 42A of the hub 42 will rest against the ends of the fingers forming the hub 16 of the standard insert holding the compact disc 18 in place. Additionally, the outwardly facing surfaces 40A of the corner bosses 40 will be very closely adjacent to upper surfaces of the corner regions 14 of the standard compact disc tray 13 in the bottom section of the jewel case. If the adapter insert 38 in the jewel case lid section 12 is forced toward the standard tray 13, the surfaces at the respective corner bosses will contact before the two CD's contact and a spacing will be maintained to avoid damage to information on the compact discs. The adapter insert 38 thus maintains a spacing between the two compact discs. The hub 42 retains the second compact disc 54 under the interference friction fit and the second disc 54 does not slide toward the first disc 18 when the jewel case lid section is in its closed position as shown in FIG. 5.

The insert panel 39 has sufficient rigidity so that when it is held by the tabs 30 and the lid panel 26 of the jewel case 10 is inverted, the weight of a compact disc 54 held on the insert 38 will not cause the adapter insert panel 39 to bow away from lid panel 26 and come loose from the tabs 30, but rather the adapter insert 38 remains retained in the lid section even if the jewel case 10 is open and inverted, and jarred slightly.

The adapter insert 38 provides a low cost adapter for converting standard jewel cases 10 for single compact discs into a dual disc package. The single disc 18 can still be automatically loaded along with the standard tray 13, and then the adapter insert 38 of the present invention may be manually inserted and the disc 54 manually placed into position on the adapter insert in the lid panel 26 of the jewel case. Automated equipment can be used to load adapter insert 38 and this second CD if the volume of dual package sales justifies the capital. The adapter insert 38, and the outer end hub and corner boss surfaces of the standard tray 13 are formed so that they will not engage to cause a bulging of the lid section or interfere with the closing of the lid section 26. One or two printed sheets can be slipped behind the adapter insert panel 39 when the tabs 30 are holding the adapter insert 38 in position. The height of surface 49 relative to the back surface of the insert panel 39 can be held closely to leave adequate room for a sheet of paper carrying the title and other compact disc information.

There are recesses 48 on all four sides of the adapter insert 38. Since the adapter insert is symmetrical about mutually perpendicular bisecting axes, which are also perpendicular to the side edges, the orientation of the square adapter insert is not critical. The corner bosses 40, as stated, are spaced from the edges of the insert panel 39 by rims 39A so the insert panel can be trimmed to size with fairly close tolerances after the hub and corner bosses are formed.

The adapter insert 38 can be used in other packages as well. For example, the adapter insert may be used in a folding package of more flexible material, or card stock if the package has a panel with spaced tabs or even spaced raised ledges that would receive the edges of the insert panel 39 and retain adapter insert 38 on such panel. The disc retaining and positioning features of the adapter insert make it usable in other style packages also. For example, a package made similarly to that shown in U.S. Pat. 4,709,812 could have spaced tabs or retainers for receiving the present insert. The flat edge portions to the outside of the corner bosses aid in proper positioning and the upper surfaces of the corner bosses can slip under overhanging surfaces of various types of retainer tabs or ledges.

The tabs 39 on one wall of the lid section can be made longer in direction along the wall than that which is shown, or one elongated ledge or rail can be provided, under which the corner bosses 40 would be retained. However, the adapter insert 38 as shown specifically adapts a standard jewel case for use as a dual CD package.

According to an especially preferred embodiment, the adapter can also be used as a disc holder in packages of more flexible material, such as paperboard. Referring to FIG. 6, a paperboard optical disc package is shown generally at 100. Package 100 comprises a base panel 101 and a cover panel 108, hingedly connected by panel 106, with hinging provided by scored bend lines 107. Scoring of paperboard by compressing a narrow region along a straight line so as to form a bendable section which acts as a hinge is a well known paperboard fabrication technique. Base panel 101 and cover panel 108 typically comprise two layers, an upper layer forming the interior surface of the container, and a lower layer forming the exterior of the container. The upper and lower layers are typically attached to one another by adhesive applied in selected locations.

Insert holding slots 102 are formed in base panel 101 by cutting partial annular slots 102 in the upper layer of base panel 101. Inner portion 103 of the upper base panel is adhesively attached to the lower layer of base panel 101, while outer portions 104 of the upper layer of base panel 101 are not so adhered, at least not in the region near slots 102.

This allows the upper layer of base panel 101 to separate from the lower base panel in outer portions 104.

Adapter insert 138 is assembled onto base panel 101 by inserting corners 151 into slots 102, so that corners 151 slide past slot edges 105 to enter the space between the upper and lower base panels in outer portion 104. Because adapter insert 138 is flexible, it is able to bend sufficiently to allow all four corners 151 to be inserted into slots 102.

Figure 7:
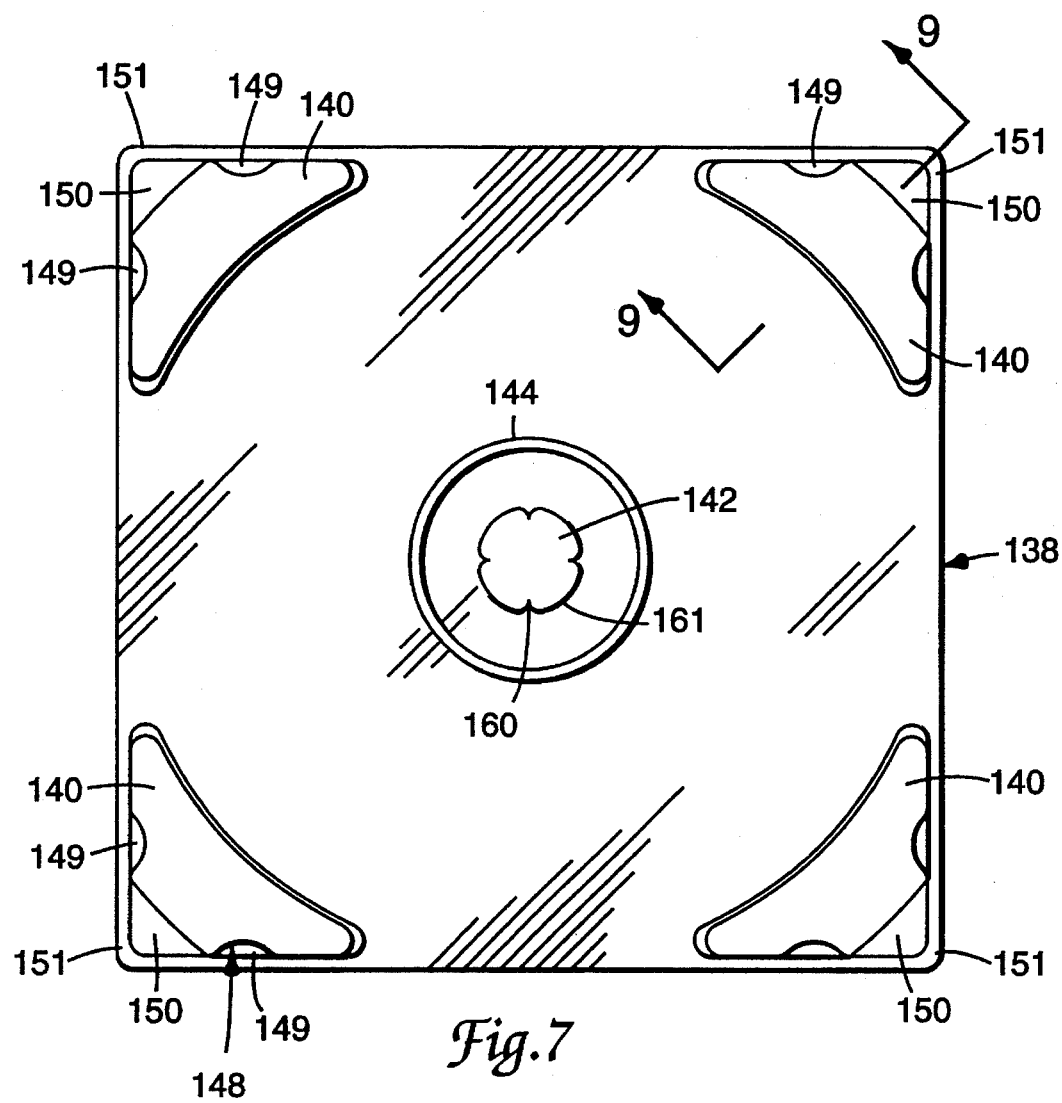
FIG. 7 is a top plan view of a second embodiment of the present invention adapted to be used in either a jewel case or in a paperboard package.
Figure 8:
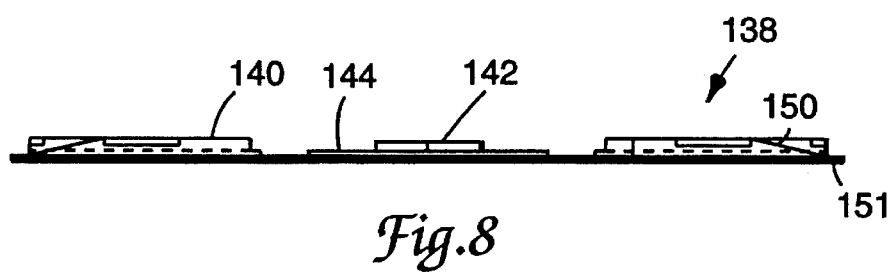
FIG. 8 is a side elevational view of a second embodiment of the present invention adapted to be used in either a jewel box or in a paperboard package.
Figure 9:
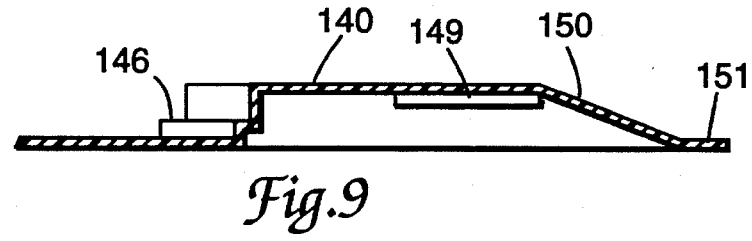
FIG. 9 is a sectional view of the peripheral support boss of a second embodiment of the present invention.

Adapter insert 138 is an especially preferred embodiment of the present invention which comprises, in addition to the features of adapter insert 38 of the previous embodiment, corner insertion wedges 150. Referring to FIGS. 7 and 9, corner insertion wedges 150 are downward sloping portions of raised peripheral support bosses 140 which act as wedges to separate the top base panel from the bottom base panel of portions 104 during insertion of corners 151 into slots 102, thereby facilitating assembly and reducing the risk of tearing or kinking of the paperboard in the region of portions 104.

In addition, the shape of wedge 151 allows the paperboard in region 104 to assume a more natural and streamlined shape, thereby improving the overall appearance of package 100.

Although the present invention has been described with reference to preferred embodiments, workers skilled in the art will recognize that changes may be made in form and detail without departing from the spirit and scope of the invention.

What is claimed is:

1. An adapter insert for holding an optical disc in a package, the adapter insert comprises:
   a) a base panel of a flexible material,
   b) raised corner bosses at the corners of the base panel, wherein the bosses have downward sloping outside corner wedges and have inner peripheral edges which conform to the periphery of the optical disc to be held and which have support lands for supporting a portion of the periphery of the optical disc, and
   c) a center hub extending upward from the center of the base panel for fitting within a central bore of the optical disc to be held.

2. The adapter insert of claim 1 in which the hub has a peripheral surface which tapers from a larger size at an outer end to a smaller size adjacent to the base panel.

3. The adapter insert of claim 2 in which the hub forms an interference fit with the bore of the optical disc to be held by the adapter insert.

4. The adapter insert of claim 2 in which the hub has inwardly directed recesses formed around an outer peripheral edge of the hub.

5. The adapter insert of claim 1 in which the flexible material is a polymer and the base panel has a thickness of 0.015 inch.

6. The adapter insert of claim 1 wherein there are four corner bosses, and the corner bosses have outer edges with at least one recess in each outer edge.

7. The adapter insert of claim 1 in which the raised corner bosses and the hub are formed from the flexible material and are integral with the base panel.

8. A jewel case assembly forming a package for a set of two optical discs, the assembly comprising a jewel case having a bottom section and a lid section hingedly connected together and having an optical disc tray in the bottom section for supporting a first optical disc,
   the lid section comprising a lid panel having spaced side walls, and tabs on the side walls extending inwardly to overlie the lid panel, and the tabs being spaced from an inner surface of the lid panel and
   an adapter insert having a peripheral size to fit between the side walls of the lid section and being sufficiently flexible to permit edge portions of the adapter insert to be inserted under the tabs of the lid panel, the adapter insert comprising (i) a base panel of flexible material, (ii) raised corner bosses with inner peripheral edges conforming to the periphery of a second optical disc to be held, the raised corner bosses having downward sloping outside corner wedges and having outer edges with inwardly extending recesses to receive the tabs of the lid section of the jewel case and having inner peripheral edges which conform to the periphery of the second optical disc to be held and which have support lands for supporting a portion of the periphery of the optical disc away from the surface of the base panel, and (iii) a center hub for retaining the second optical disc.

9. A package assembly for holding optical discs comprising
   an adapter insert comprising a base panel of a flexible material, raised corner bosses at the corners of the base panel, wherein the bosses have inner peripheral edges which conform to the periphery of the optical disc to be held and which have support lands for supporting a portion of the periphery of the optical disc and downward sloping outside corner wedges, and a center hub extending upward from the center of the base panel for fitting within a central bore of the optical disc to be held, and
   an outer covering comprising a base panel and a cover panel hingedly connected by a connecting panel, wherein the base panel comprises an upper layer and a lower layer which are partially attached to each other, the upper layer having corners with slots near the corners which allow for insertion of the corner wedges of the adapter insert between the upper and lower layers.

* * * * *